Oct. 14, 1941.   T. F. BARTON   2,259,098
REGULATING SYSTEM
Filed Aug. 10, 1940
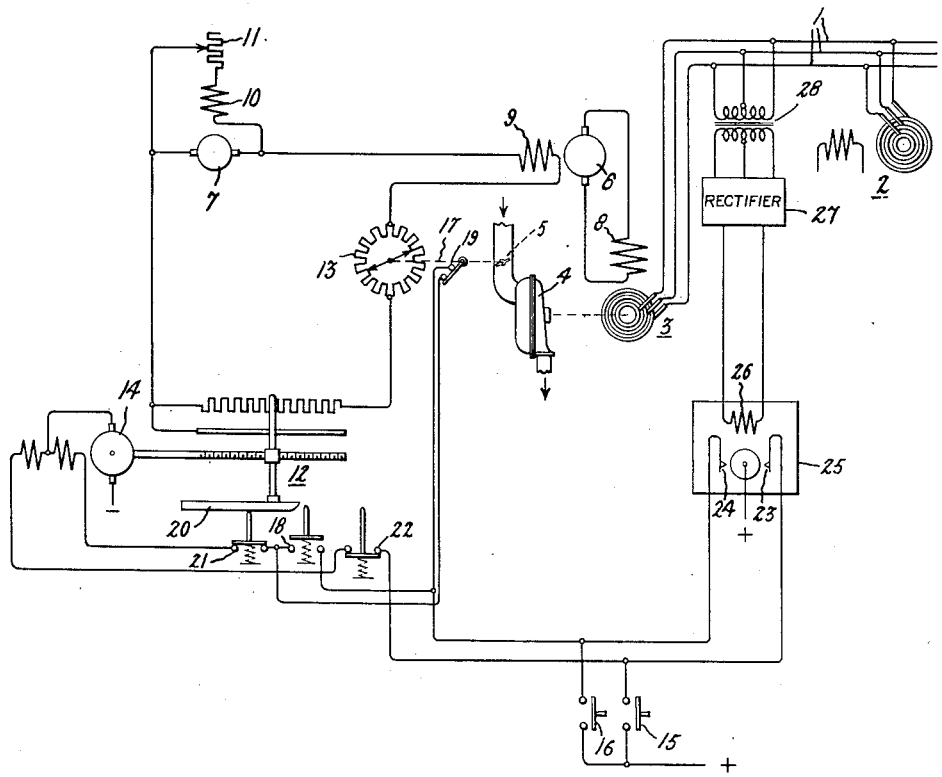
Inventor:
Theophilus F. Barton,
by Harry E. Dunham
His Attorney.

Patented Oct. 14, 1941

2,259,098

UNITED STATES PATENT OFFICE 2,259,098

REGULATING SYSTEM

Theophilus F. Barton, Upper Montclair, N. J., assignor to General Electric Company, a corporation of New York Application August 10, 1940, Serial No. 352,100

4 Claims. (Cl. 290—7)

This invention relates to regulating systems and more particularly to a system for stabilizing a synchronous dynamo-electric machine.

As synchronous machines operate almost always at constant speed, the power which they translate is proportional to their torque. It is well known that the pull-out torque of such machines is proportional to their excitation. By "pull-out torque" is meant the torque at which the machine loses synchronism with the other synchronous machine or machines connected to it. As soon as this pull-out torque is exceeded the synchronous-to-synchronous system loses stability and no longer operates as a synchronous system. The relation between pull-out torque at various loads and the minimum excitation necessary to provide this pull-out torque is a direct proportion over the normal load range. At overloads the effect of the external system characteristics and saturation alter this directly proportional relation slightly.

Heretofore the usual way of protecting against instability has been to design the synchronous machine to have what is known as a high (nearly unity) short circuit ratio and to provide it with an automatic voltage regulator. A high short circuit ratio machine is relatively "stiff" and can take relatively large and sudden increases in load at constant excitation without loss of synchronism. However, it requires an uneconomical relation of rotor length to diameter and therefore results in a machine having a relatively high cost per kva as compared with machines having low short circuit ratios of the order of seven-tenths. An automatic voltage regulator responds to the reduction in voltage which usually accompanies an increase in load and acts to increase the excitation so as to maintain the voltage constant and this increase in excitation raises the pull-out torque of the machine and therefore provides stability. However, the voltage regulator is also affected by variations in reactive load so that the change in excitation which it produces is not always conducive to stability.

Furthermore, certain system operators prefer not to relay on voltage regulators for providing stability because they feel that the potential transformer, fuses and, in certain cases, vibratory contacts which these devices use are not sufficiently reliable where stability is a problem.

Among such operators are the operators of some large metropolitan systems. In such large systems unanticipatable load variations are usually such a small fraction of the total load that variations in system voltage as a result of these unanticipatable load changes are insignificant. In such systems the total load varies in an anticipatable manner throughout the day so that central station attendants can manually adjust the excitation of the machines in their charge in accordance with a prearranged time schedule so that the need for automatic voltage regulators for securing voltage regulation is largely eliminated.

However, loss of synchronism or stability is far more serious than a temporary under-voltage condition and therefore there is a need for automatic means for insuring stability.

In accordance with my invention I provide a novel and simple automatic stabilizer for synchronous machines which can operate independently of or in conjunction with conventional automatic voltage regulating means. It is characterized by the use of means for automatically varying the excitation in accordance with variations in load on or power translated by the synchronous machine and permits the safe use of a relatively inexpensive low short circuit ratio machine.

An object of the invention is to provide an automatic stabilizer for synchronous dynamo-electric machines.

Another object of the invention is to provide a simple and reliable regulating system for synchronous machines.

The invention will be better understood from the following description taken in connection with the accompanying drawing and its scope will be pointed out in the appended claims.

Referring now to the single figure of the accompanying drawing which illustrates diagrammatically a particular embodiment of the invention, there is shown therein a synchronous-to-synchronous alternating current power system comprising a power circuit 1 for interconnecting a pair of synchronous dynamo-electric machines 2 and 3. Machine 3 is an alternator or synchronous generator which is driven by a suitable prime mover 4 such as a steam turbine which is provided with an inlet or throttle valve 5 operated automatically by the conventional turbine speed governor (not shown). The excitation circuit for machine 3 comprises a main exciter 6 and a pilot exciter 7. The main exciter is connected to the direct current field winding 8 of the alternator and its own field winding 9 is separately excited by the pilot exciter 7. The pilot exciter is self-excited by a shunt field winding 10 provided with a field rheostat 11. Serially connected in the separate excitation circuit for the main exciter is a regulating rheostat 12 and an auxiliary stabilizing rheostat 13.

The regulating rheostat 12 is arranged for remote control by being provided with a reversible operating motor 14 controlled by raise and lower push buttons 15 and 16. By means of these push buttons a central station attendant can manually control the excitation of the alternator 3 at will.

The stabilizing rheostat 13 is operated in accordance with the power translated by the alternator 3 by driving it from the throttle 5 through suitable connecting means 17, although, it will, of course, be understood that any other equivalent means for positioning the rheostat 13 in accordance with the load on the alternator 3 might be employed. The arrangement is such that when the throttle valve 5 is closed the rheostat 13 is in its maximum resistance position so that when the throttle is opened by degrees the resistance of the rheostat 13 is progressively decreased so as to raise the excitation and pull-out torque of the alternator.

The control of the rheostat 12 by the operator through manipulation of the push buttons 15 and 16 is also restricted under certain operating conditions, such as when the alternator is carrying a load and when the resistance of the rheostat is above a predetermined value. As shown by way of example, suitable means for accomplishing this result comprises two sets of contacts 18 and 19 connected in parallel with each other in the lowering circuit which is controlled by the push button 16. Contacts 19 may be operated by the throttle 5, as this provides a reliable indication of the fact that the alternator is carrying load. These contacts are arranged to be closed when the throttle 5 is closed and to be opened when the throttle is opened sufficiently to indicate that the alternator 3 is carrying load. The contacts 18 are operated in accordance with the position of the rheostat by means of a suitable cam-like element 20 connected to move with the rheostat. The predetermined rheostat position at which the contacts 18 are operated may, for example, be the position corresponding to normal excitation of the alternator. By "normal excitation" is meant the excitation which produces normal or rated alternator voltage at no load. When the resistance of the rheostat is such as to give greater than normal excitation the contacts 18 are closed and when its resistance is such as to give less than normal excitation the contacts 18 are open.

The cam 20 is also arranged to operate conventional limit switches 21 and 22 connected respectively in the raise and lower controlling circuits for the motor 14. The function of these switches is to prevent travel of the rheostat beyond its proper range in either direction in case the operator holds either one of the push buttons closed too long.

In certain cases it may be desirable to supplement the operator and provide a further factor of safety by adding an automatic voltage regulator. This may be done by connecting the raise and lower controlling contacts 23 and 24 of a suitable automatic voltage regulator 25 respectively in parallel with the raise and lower push buttons 15 and 16. Such a regulator is usually provided with a primary control winding 26 which may be connected to respond to the voltage of all of the phases of the circuit 1 by means of a polyphase rectifier 27 whose output terminals are connected to the winding 26 and whose input terminals are connected to an open-delta-connected potential transformer arrangement 28.

The operation of the invention is as follows. With no load on the machine 3 the rheostat 12 may be operated throughout its entire range, as determined by limit switches 21 and 22. Thus, if machine 3 happens to be operating as a synchronous condenser full range of wattless current control is obtainable. The throttle 5 will be fully closed or substantially closed so that contacts 19 remain closed and therefore the opening and closing of contacts 18 when the rheostat 12 is operated through the position corresponding to normal excitation will have no effect. The resistance value of rheostat 13 will be at its maximum.

If now machine 3 is called upon to deliver power as a synchronous generator, the inlet valve 5 will automatically be opened in the ordinary course of events and this will open the contacts 19 and decrease the resistance of rheostat 13. The correlation between the degree of opening of the inlet valve 5 and the reduction in resistance of rheostat 13 is preferably such that if rheostat 12 is in the position corresponding to normal no-load voltage the increase in excitation due to the reduction in resistance of rheostat 13 will be sufficient to maintain normal voltage and substantially unity power factor. The opening of the contacts 19 automatically restricts the range of operation of the rheostat 12 to positions which produce greater than normal excitation of the alternator because as soon as the rheostat reaches the normal excitation point the contacts 18 will open thereby opening the lowering circuit for the operating motor 14 and preventing further increases in resistance of the rheostat 12.

Consequently, the combined action of the stabilizing rheostat 13 and the range restricting contacts 18 and 19 of the rheostat 12 is such as effectively to prevent under-excited operation of the alternator at any time when it is carrying load. Therefore, it is impossible for the alternator to lose stability for any variations in load up to its inherent capacity to carry load at rated voltage and it will be seen that this is accomplished by simple and rugged means which does not depend upon the use of potential transformers, fuses or intermittently operated contacts.

It will, of course, also be understood that the same result may be secured by connecting the rheostats 12 and 13 in parallel instead of in series.

The function of the regulator 25 when it is used is to correct for power factor variations on the circuit 1, such as might be caused by improper excitation of other synchronous machines connected to the circuit. In other words, the regulator 25 can correct for reactive power variations whereas the stabilizer corrects the excitation for variations in kilowatt load on the alternator.

Furthermore, if desired, the sensitivity or band width of the automatic regulator 25 may be given a relatively insensitive or wide setting so that normal excitation adjustments are made manually by means of the push buttons 15 and 16 and only in the case of the occurrence of wide deviations of voltage from normal, such as might be the result of inattention on the part of the attendant, will the automatic regulator go into action and prevent further departures of the voltage from normal.

While there has been shown and described a particular embodiment of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In a synchronous-to-synchronous power system, in combination, an alternator, a direct current excitation circuit for said alternator, automatic means for varying the current in said circuit in proportion to variations in kilowatt load on said alternator, manually operable means for raising and lowering the current in said circuit independently of said automatic means, and means responsive to the existence of a kilowatt load on said alternator which exceeds a predetermined value for restricting said manually operable means to a range of currents above a predetermined safe value for stability of said alternator.

2. In combination, a synchronous-to-synchronous power system including an alternator, a direct current excitation circuit for said alternator, said circuit having a normal value of current corresponding to rated alternator voltage at no load, a pair of rheostats connected for controlling the current in said circuit, means for varying the resistance of one of said rheostats in inverse relation to the kilowatt output of said alternator, movable means for raising and lowering the resistance of the other rheostat, and means responsive to the position of said movable means and to the kilowatt output of said alternator for preventing the resistance of said other rheostat from being increased if its value is above that which corresponds to said normal value of current at a time when there is a kilowatt load on said alternator which exceeds a given value.

3. In combination, a synchronous-to-synchronous power system including an alternator having a direct current field winding, a separately excited main exciter for said field winding, a pilot exciter for said main exciter, a pair of rheostats connected in the excitation circuit of said main exciter, a prime mover for driving said alternator, a valve for controlling the flow of operating fluid to said prime mover, means for varying the resistance of one of said rheostats in inverse proportion to the degree of opening of said valve, a motor for driving the other rheostat, separate circuits for controlling the direction of operation of said motor, a set of contacts arranged to be open when said valve is open more than the amount required by said prime mover to drive said alternator under predetermined minimum load conditions and to be closed at other times, and another set of contacts arranged to be open when the resistance of said other rheostat is above a predetermined value and closed when it is below said value, said sets of contacts being connected in parallel with each other in the circuit for causing said motor to increase the resistance of said other rheostat.

4. In combination, a synchronous-to-synchronous power system including an alternator having a direct current field winding, a separately excited main exciter for said field winding, a pilot exciter for said main exciter, a pair of rheostats connected in the excitation circuit of said main exciter, a prime mover for driving said alternator, a valve for controlling the flow of operating fluid to said prime mover, means for varying the resistance of one of said rheostats in inverse proportion to the degree of opening of said valve, a motor for driving the other rheostat, separate circuits for controlling the direction of operation of said motor, a set of contacts arranged to be open when said valve is open more than the amount required by said prime mover to drive said alternator under predetermined minimum load conditions and to be closed at other times, another set of contacts arranged to be open when the resistance of said other rheostat is above a predetermined value and closed when it is below said value, said sets of contacts being connected in parallel with each other in the circuit for causing said motor to increase the resistance of said other rheostat, and means responsive to the voltage of said alternator for controlling the energization of said motor direction of operation controlling circuits.

THEOPHILUS F. BARTON.